United States Patent Office 3,189,596
Patented June 15, 1965

3,189,596
METHOD FOR FRACTIONATING AQUEOUS EXTRACTS FROM BARKS OF TREES
David L. Brink, Berkeley, Calif., assignor to Weyerhaeuser Company, Tacoma, Wash., a corporation of Washington
No Drawing. Filed Oct. 3, 1961, Ser. No. 142,489
4 Claims. (Cl. 260—209)

This invention relates to the process of isolating valuable chemical substances from material of vegetable origin and has particular reference to a method for separating an aqueous extract of the bark of trees into a fraction comprising substantially entirely aromatic organic chemical substances and a fraction comprising substantially all of the carbohydrate substance.

Material of vegetable origin normally consists of a large number of chemical substances with each substance other than cellulose representing but a small fraction of the total. Moreover, component substances normally are highly divergent in their chemical properties and hence in chemical reactivity. Consequently, if such vegetable material is to be used as chemical raw material, it must first be separated into fractions containing similar molecular types which undergo similar reactions under a given set of conditions.

Specifically, whole Douglas fir bark when extracted with hot water yields approximately 10% of its dry weight as water-soluble extract. A representative sample of this extracted material comprises (on a dry extract basis) approximately:

*Table I*

| | Percent |
|---|---|
| (1) Dihydroquercetin | 15 |
| (2) Other aromatic substances, primarily phenolics | 65 |
| (3) Carbohydrates and soluble residuals | 20 |

The first two categories comprise substances which are largely aromatic in character, primarily phenolics. These comprise dihydroquercetin, a group of polyphenols, and other phenols or phenolic polymers. The third category comprises carbohydrate material, including 25–35% of reducing sugars. The phenolic substances have utility as tanning agents and as additives for oil well drilling fluids, but their usefulness is reduced by the presence of the non-phenolic components which do not undergo the same reactions as the phenols. Also, the non-phenolics have utility which is markedly reduced or masked by the presence of substantial quantities of phenolic substances. Hence, the separation of such a mixture into one fraction comprising substantially entirely aromatic compounds and into a second fraction comprising substantially all of the carbohydrate material is desirable for full realization of their usefulness.

Such an isolation of individual chemical substances or of mixtures of substances in good yield and of sufficient purity to be used as commercial chemicals has been attempted by many investigators. Normally, these attempts have followed the typical analytical procedure involving sequential extraction with solvents, most of which are expensive and/or hazardous to use. Most such extraction techniques do not utilize all of the products of the treatment. Therefore, the state of the art is such that more economical and less hazardous methods of bark extraction and extract fractionation must be developed.

It has been discovered that such fractionation may be achieved by treatment of the mixture of solutes in aqueous solution with (at least partially) water-dissociable compounds of the alkaline earth metals, preferably associated with careful adjustment of hydrogen ion concentration and with attention also being paid profitably to the secondary variables of extract concentration and reaction temperature.

By this means two products result, each of which is more uniform in composition than is the gross mixture and both of which have enhanced utility.

It is therefore an object of this invention to provide a method for the separation of the components of an aqueous extract from material of vegetable origin into a plurality of products by use of water dissociable compounds containing alkaline earth metals, with each product containing chemically related substances and each product having utility and value.

It is a particular object of this invention to provide a method whereby dissolved substances resulting from the aqueous extraction of the barks of trees or of mechanically separated fractions of the barks of trees are separated into fractions one of which comprises substantially entirely aromatic organic substances and another comprises substantially entirely carbohydrate material by use of water dissociable compounds containing alkaline earth metals with each product having enhanced utility over that of the original extract.

A further object is to provide a method for substantially quantitatively isolating an aromatic organic chemical fraction from an aqueous extract from material of vegetable origin and particularly the bark of trees or mechanically separated fractions thereof by the use of water dissociable compounds containing alkaline earth metals under adjusted and controlled conditions of alkalinity.

Further objects and advantages of this invention will be apparent from the following description and examples.

According to the practice of this invention material of vegetable origin, particularly the bark of trees or mechanically separated fractions thereof, is extracted with water at elevated temperatures. A preferred method is that of employing a continuous countercurrent process such as described in U.S. Patent No. 2,832,765, issued April 29, 1958, to James R. Roberts and Arthur S. Gregory for Extraction Method.

The pH of the water extract is then adjusted to a value of 10 or higher, and a water dissociable compound containing an alkaline earth metal is added, resulting in a precipitate of the aromatic organic chemicals present in the original extract. It is permissible and a preferred practice to add oxides or hydroxides of alkaline earth elements to simultaneously provide alkaline earth ions and adjust the pH to a value of 10 or higher.

Precipitation of aromatic components takes place in limited extent at low pH levels (as, for example, by addition of calcium chloride to extract at pH 6.0) and increases in amount as the alkalinity is increased. At pH 10, the precipitation is substantially quantitative, although isolation of the maximum quantity of dihydroquercetin is insured by increase in alkalinity to pH values of at least 12.5.

Utility of the products resides in their improved uniformity which results in a minimum of undesirable side reactions when the products are used as chemical reagents. The precipitated product provides the chroman derivative and the phenolic material in convenient form for further processing. When changed to free organic form the mixture has marked collagen precipitating properties and is therefore valuable in the field of hide tanning. It has utility as a conditioner of oil well drilling fluids. Moreover, chroman derivatives have unique properties and value in such fields as pharmaceuticals and as industrial antioxidants. Therefore, one very important use of the co-precipitated material is as a primary mixture which serves as the satisfactorily concentrated starting material for the isolation and separation of chroman derivatives form the other aromatics in order to achieve maximum utility and economic return. Methods of carrying out such separation are beyond the scope of the present invention.

The liquid phase which is separated from the co-precipitate has utility in the form in which it is produced as a dilute solution comprising carbohydrates.

In order to obtain optimum results, care must be exercised in the control of the following variables: alkalinity, concentration of the aqueous extract, the quantity of alkaline earth metal ion added, and temperature.

The amount of aromatics precipitated, other factors remaining constant, varies directly with increasing alkalinity of the extract. For relatively complete precipitation of the aromatic compounds, a pH value of at least 10 is required. It has been found preferable to adjust to pH values of 12.5 and higher for successful fractionation. The alkalinity may be adjusted in a variety of ways.

(1) the pH value may be adjusted from the normally acidic value of the original extract by use of an alkaline-reacting substance such as sodium hydroxide and ammonium hydroxide. After pH adjustment the alkaline earth metal precipitant may be added, said precipitant being chosen such that its addition does not affect the adjusted pH value materially.

(2) The desired amount of alkaline earth metal ion precipitant may be added to the extract, said precipitant, such as calcium chloride, having little effect on the pH of the extract. The pH value of the system is then adjusted to the desired level as described above.

(3) The pH level adjustment and the addition of the precipitant may take place simultaneously by the addition of a water-dissociable alkaline-reacting alkaline earth metal compound such as calcium hydroxide.

(4) The pH level may be adjusted partially by the addition of an alkalizing agent and completed by the addition of an alkaline-reacting precipitant such as calcium hydroxide.

(5) A precipitant may be added in quantity to adjust the pH value to the desired level and any deficit in precipitant may be made up by addition of alkaline earth metal compound which has little or no effect on pH. For example, the desired pH level may be achieved by addition of calcium hydroxide or calcium oxide to the extract and the remainder of the desired amount of calcium ion may be added as calcium chloride.

(6) Various combinations of the techniques described above may be employed, it merely being required that the pH level of the system be at the desired level before the separation step is applied.

The concentration of the aqueous extract is of some importance as a variable. Other factors remaining constant, the higher the concentration of dissolved material the more complete the precipitation of the aromatics. The countercurrent water exraction of bark normally results in an extract concentration of the order of 3%. Since concentration of the extract, by means of solvent removal or by evaporation, is costly, the invention may be applied successfully to extracts having this level of concentration.

The quantity of alkaline earth ions added is a variable which behaves in the anticipated manner in accordance with the law of mass action. When applied countercurrently (and continuously) experience indicates that an amount of precipitant equivalent to approximately 20% of the total solids in the extract, said amount being calculated as the oxide of the alkaline earth metal, is a minimum amount of material which provides substantially quantitative precipitation of aromatics. When applied to a single batch, the required quantity of precipitant is greater.

The reaction between the alkaline earth ions and the aromatics takes place rapidly and consequently does not require a high temperature to permit the reaction to take place at an accelerated rate. Many of the aromatic substances are subject to air-oxidation when heated in the presence of air under alkaline conditions. If it is desired that the aromatics not be oxidized, it is required that the temperature of the extract be adjusted to at least room tmperature or even lower where practical. Alternatively, it is permissable to carry out the reaction in an inert atmosphere. Experience has shown that the best yields of aromatics including dihydroquercetin which have been obtained by application of the present invention to aqueous extract of Douglas fir bark have been obtained when the precipitant was added to the refrigerated extract.

The following specific example illustrates the invention in greater detail:

EXAMPLE I

Aqueous extract of whole ground Douglas fir bark was prepared by countercurrent extraction with water at elevated temperature of hydraulically removed bark from pond floated logs. The hot extract was non-turbid and reddish-brown in color. It contained 3.09% soluble solids. The composition of the extract (dry extract basis) was as follows:

*Table II*

|  | Percent |
|---|---|
| (1) Dihydroquercetin | 12.80 |
| (2) Other aromatic substances, primarily phenolics | 69.64 |
| (3) Carbohydrates and soluble residuals | 17.45 |

A volume of extract calculated to contain 100 grams of dissolved solids was isolated, cooled to room temperature and treated with a slurry containing 20.0 grams of calcium hydroxide. The pH of the solution (originally about 3.5) became about 12.5 and a heavily hydrated precipitate formed. The precipitate was removed by vacuum filtration and repeatedly washed with room temperature water. The washings were added to the original filtrate.

Both the precipitate and the filtrate were analyzed for the components tested for in the summative analysis above for the original solution. The percentage compositions of the two separated fractions together with the percentages distribution of each component between the fractions are tabulated in the following table. Components are identified by the same numerals as are used in the analysis of the original extract (Table II).

*Table III*

| Component | Composition, percent | | Distribution, percent | |
|---|---|---|---|---|
|  | Precipitate | Solution | Precipitate | Solution |
| 1 | 15.20 | 0.82 | 97.67 | 2.33 |
| 2 | 82.10 | 50.67 | 78.62 | 21.38 |
| 3 | 2.70 | 48.51 | 11.23 | 88.77 |

The effect of the lime precipitation was the formation of two phases representing substantially quantitative separation of the valuable dihydroquercetin (97.67% in the precipitate) and the carbohydrate material (88.77% in the solution phase). Furthermore, it provided a fraction largely aromatic in character and substantially free of carbohydrate material which behaves either as a useless diluent or as a positively deleterious component for certain purposes for which the aromatics may be used.

The precipitate was gelatinous in nature and contained approximately one-seventh of the original solvent water. Whereas the dihydroquercetin occurred in the original extract as 0.41 gram per 100 cc. of solvent water, in the precipitate, which could be re-solubilized by addition of strong acid, the dihydroquercetin concentration had become 2.44 grams per 100 cc. of solvent. This provides more useful concentration of dihydroquercetin and of the other phenolics for direct utilization, for further concentration or for fractionation of the aromatics.

The example is to be considered illustrative only and the inventors do not wish to have their protection limited by the details contained therein. Neither is it intended that the coverage be limited by any stated or implied mechanism of reaction other than as defined in the following claims.

I claim:

1. The process of fractionating an aqueous extract derived by treating comminuted tree bark with water at elevated temperatures and containing in solution, aromatic substances including dihydroquercetin, polyphenols, phenols and phenolic polymers and carbohydrate substances including reducing sugars, comprising adjusting the pH of said extract to at least 10, and treating said extract with at least 20%, based on the weight of the dissolved solids, of a water dissociable alkaline earth metal compound, calculated as the oxide of the alkaline earth metal, under substantially non-oxidizing conditions to form a precipitate phase containing the aromatic substances and a solute phase containing the carbohydrate substances, and separating the respective phases.

2. The process of claim 1 wherein said pH is adjusted by the addition of alkali metal hydroxide and the said extract is cooled to at least room temperature to provide substantially non-oxidizing conditions.

3. The process of fractionating an aqueous extract derived by treating comminuted coniferous tree bark with water at elevated temperatures and having a concentration of at least 3% of the dissolved solids consisting substantially of aromatic substances including dihydroquercetin, polyphenols, phenols and phenolic polymers, and carbohydrate material including reducing sugars, comprising cooling said extract to at least room temperature, adjusting the pH of said extract to at least 10, and treating said extract with at least 20%, based on the weight of the dissolved solids, of a water dissociable alkaline earth metal compound, calculated as the oxide of the alkaline earth metal, to form a precipitate phase containing the aromatic substances and a solute phase containing the carbohydrate material, and separating the respective phases.

4. The process of fractionating an aqueous extract derived by treating comminuted Douglas fir tree bark with water at elevated temperatures and having a concentration of at least 3% of dissolved solids consisting substantially of aromatic substances including dihydroquercetin, polyphenols, phenols and phenolic polymers, and carbohydrate material including reducing sugars, comprising cooling said extract to at least room temperature, adding to the solution approximately 20 grams of calcium hydroxide per 100 grams of dissolved solids dry weight, to form a precipitate phase containing the aromatic substances and a solute phase containing the carbohydrate material, and separating the respective phases.

References Cited by the Examiner
UNITED STATES PATENTS

| | | | |
|---|---|---|---|
| 2,697,703 | 3/37 | Acree | 260—209 |
| 2,697,701 | 12/54 | Heritage et al. | 260—209 |
| 2,697,702 | 12/54 | Heritage et al. | 260—209 |
| 2,697,703 | 12/54 | Heritage et al. | 260—209 |

CHARLES B. PARKER, *Primary Examiner.*

A. H. WINKELSTEIN, *Examiner.*